W. DE LHORBE.
SEPTIC TANK.
APPLICATION FILED FEB. 9, 1921.
1,407,389.
Patented Feb. 21, 1922.
2 SHEETS—SHEET 1.
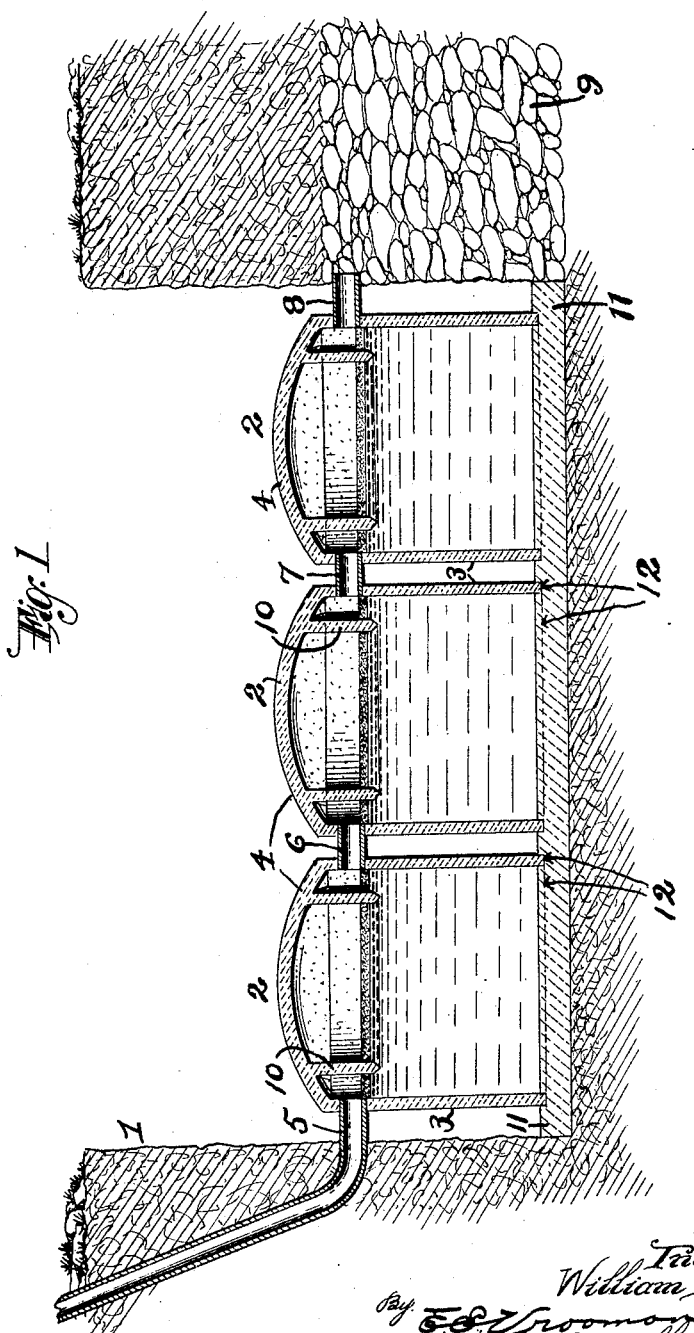

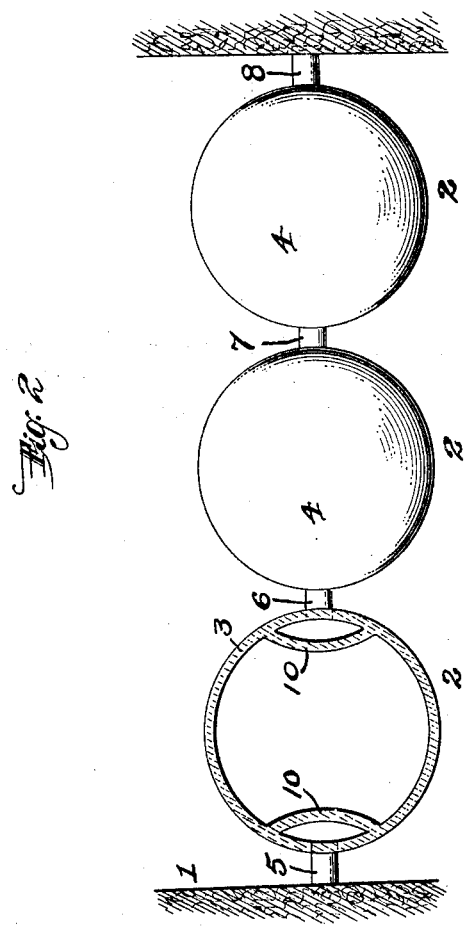

UNITED STATES PATENT OFFICE.

WILLIAM DE LHORBE, OF OREGON, ILLINOIS.

SEPTIC TANK.

1,407,389.  Specification of Letters Patent.  Patented Feb. 21, 1922.

Application filed February 9, 1921. Serial No. 443,610.

*To all whom it may concern:*

Be it known that I, WILLIAM DE LHORBE, a citizen of the United States, residing at Oregon, in the county of Ogle and State of Illinois, have invented certain new and useful Improvements in Septic Tanks, of which the following is a specification, reference being had therein to the accompanying drawings.

This invention relates to septic tanks, and the object of the invention is the construction of a tank which can be quickly placed in an operative position by even an unskilled mechanic, thereby reducing the cost of installation, although the operation of the tank, or tanks, will be highly efficient.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a longitudinal, sectional view of a battery or series of my tank, shown in an operative position.

Figure 2 is a top, plan view of a plurality of tanks, one being shown in horizontal section.

Referring to the drawings by numerals, 1 designates an excavation in which several of my tanks 2 are placed. The apparatus shown in the accompanying drawings includes a plurality or battery of the tanks, but as each tank is similarly-constructed, it will only be necessary to specifically describe one tank.

The tank 2 comprises a cylindrical body 3, open at its bottom and having at its top a convex or outwardly-bulged head 4; this head 4 constitutes a dome. An inlet tile 5 opens into the tank near the head 4, and tile 6 constitutes the outlet of the left hand tank, whereas tile 6 constitutes the inlet of the middle tank (Fig. 1). The pipe or tile 7 constitutes the outlet for the middle tank, whereas it is the inlet of the right-hand tank, and in fact is the outlet for all of the tanks, emptying into the pile of stone 9 for seepage.

Integral with the heads 4 are a pair of curved, depending partitions 10; these partitions extend below the inlet and outlet apertures of each tank, sealing the tanks (when in operation) against the appreciable entrance or escape of any foul air or gases.

After the excavation 1 has been made, in the bottom is placed a layer of concrete, or cement 11 and the tanks are placed upon this wet cement, whereupon, they will slightly sink into the same as shown at 12, Fig. 1, and when the concrete or cement 11 hardens, the bottom of each tank is securely sealed or closed.

I have found that each unit or tank works individually, and that should a connecting tile be broken, so that air can get into the tile, it will not ruin the working of the tanks, which is a common drawback to all other tanks on the market. My tanks will work with even an open conductor or trough in place of the closed pipes or tiles 5, 6, 7 and 8, provided the trough or conductor is sufficient to carry the seepage from one tank to another.

The tanks may be made of cement, concrete or burnt clay, or any other material suitable for the purpose.

It is to be understood that the inlet and outlet pipe or tile for each tank is positioned at its inner end in an inlet and outlet corresponding opening, so that each tank has an inlet and an outlet opening.

It is generally understood, that in airtight pockets, where sewer gas collects, over a quantity of sewerage a certain germ or bacteria will breed, and their numbers will become of such volume, that they will consume all of the impurities, which are commonly contained in sewerage. If fresh air is allowed to enter such a brood chamber, the bacteria will immediately die, and the purifying of the sewerage will cease at once.

The object of my septic tanks is to provide a receptacle, for sewerage, with a top or cover so arranged as to provide a brood chamber for this bacteria and to provide an inlet, and an outlet, in a manner, so that sewerage may enter and be discharged, without admitting air, and without injury to the bacteria thus formed.

The object of installing these tanks in batteries of two or more, is to take care of sewerage which is admitted at short intervals. It requires twenty-four hours, for the bacteria to thoroughly cleanse the sewerage, and where other sewerage is admitted to the tank it will force out the same quantity of partially cleansed sewerage, into the second tank, and in turn part of the second tank into the third, and so on. By this arrangement, the purification is in different stages in each tank, and finally when discharged into the pile of stones, will be clear water, chemically pure.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. A septic tank comprising a cylindrical body having an integral convex head and an open bottom, said body provided near said head with inlet and outlet apertures, and said head provided with curved, depending, integral partitions over said inlet and outlet apertures and integrally connected also to the body.

2. As a new article of manufacture, a single-piece septic tank comprising a cylinder body having an integral, dome-like top and provided at opposite sides with inlet and outlet horizontal apertures near said top, a pair of depending, curved partitions at opposite sides of the cylinder body and integral therewith and also integral at their upper ends with said top, and said partitions extending down into the body below the inlet and outlet apertures only, substantially as shown and described.

In testimony whereof I hereunto affix my signature.

WILLIAM DE LHORBE.